United States Patent [19]

Lill

[11] Patent Number: 5,077,701
[45] Date of Patent: Dec. 31, 1991

[54] DISTANCE MEASURING DEVICE

[75] Inventor: Anton Lill, Lauffen/Neckar, Fed. Rep. of Germany

[73] Assignee: SWF Auto-Electric GmbH, Bietigheim-Bissingen, Fed. Rep. of Germany

[21] Appl. No.: 613,023

[22] Filed: Nov. 13, 1990

[30] Foreign Application Priority Data

Nov. 11, 1989 [DE] Fed. Rep. of Germany ....... 3937585

[51] Int. Cl.$^5$ .............................................. G01S 15/00
[52] U.S. Cl. ....................................... 367/98; 367/99
[58] Field of Search .................. 367/98, 900, 99, 901, 367/97

[56] References Cited

U.S. PATENT DOCUMENTS 4,464,738 8/1984 Czajkowski ......................... 367/900
4,975,889 12/1990 Petrucelli et al. ..................... 367/98

Primary Examiner—Daniel T. Pihuli
Attorney, Agent, or Firm—Robert P. Seitter; J. Gordon Lewis

[57] ABSTRACT

This invention relates to a distance measuring device, in particular for motor vehicles, in which a converter is utilized for transmission of an ultrasonic signal and also for reception of the echo signal. Thereby the echo signal received by the converter is compared at a comparator with a threshold value after having been appropriately amplified. This threshold value is at a particular changeover time changed over from a first high value, which is independent of time, to a smaller, time-dependent value. Thereby the changeover time is computed from a measured time depending on the dying-out behavior of the converter.

6 Claims, 4 Drawing Sheets

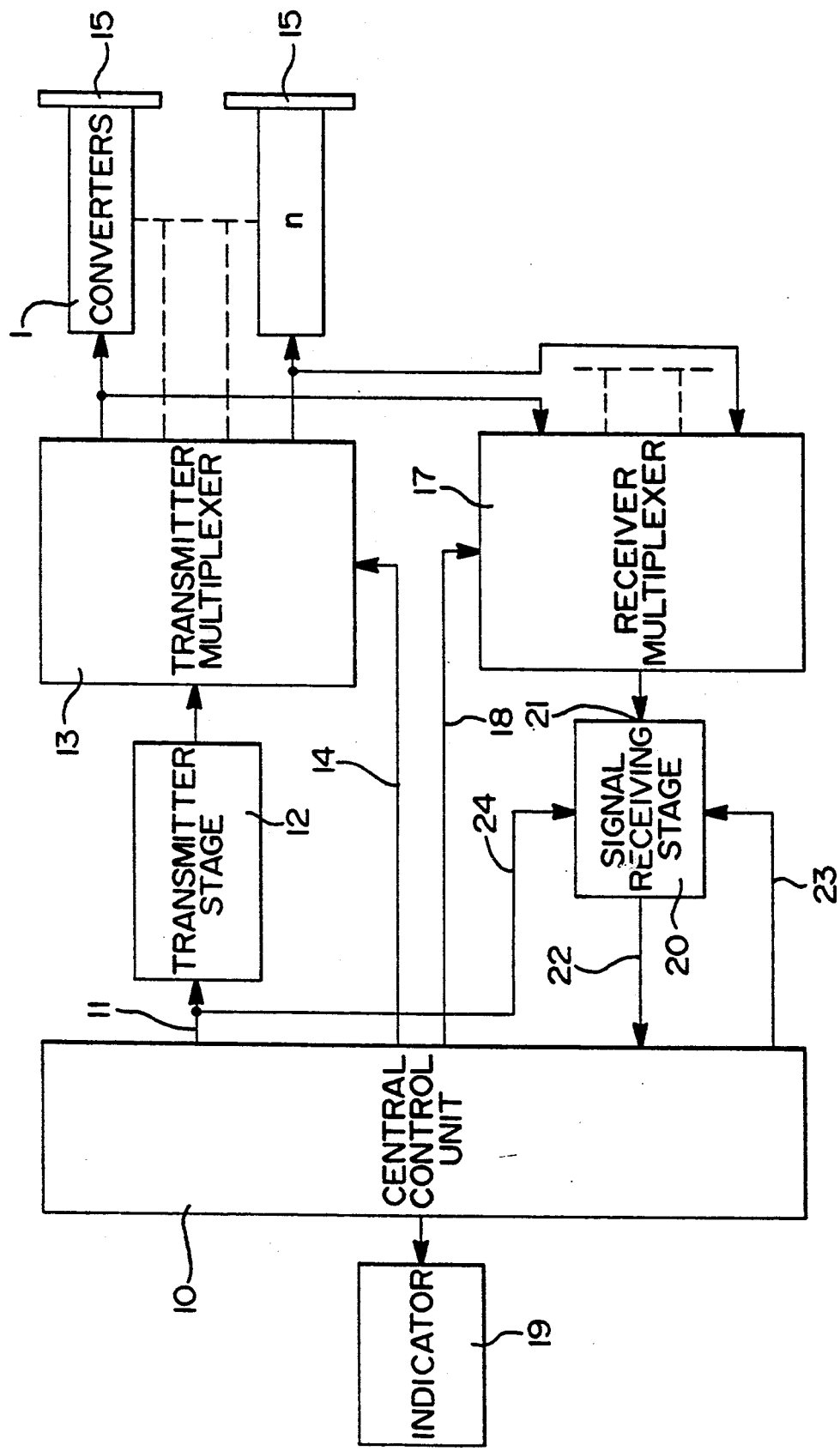

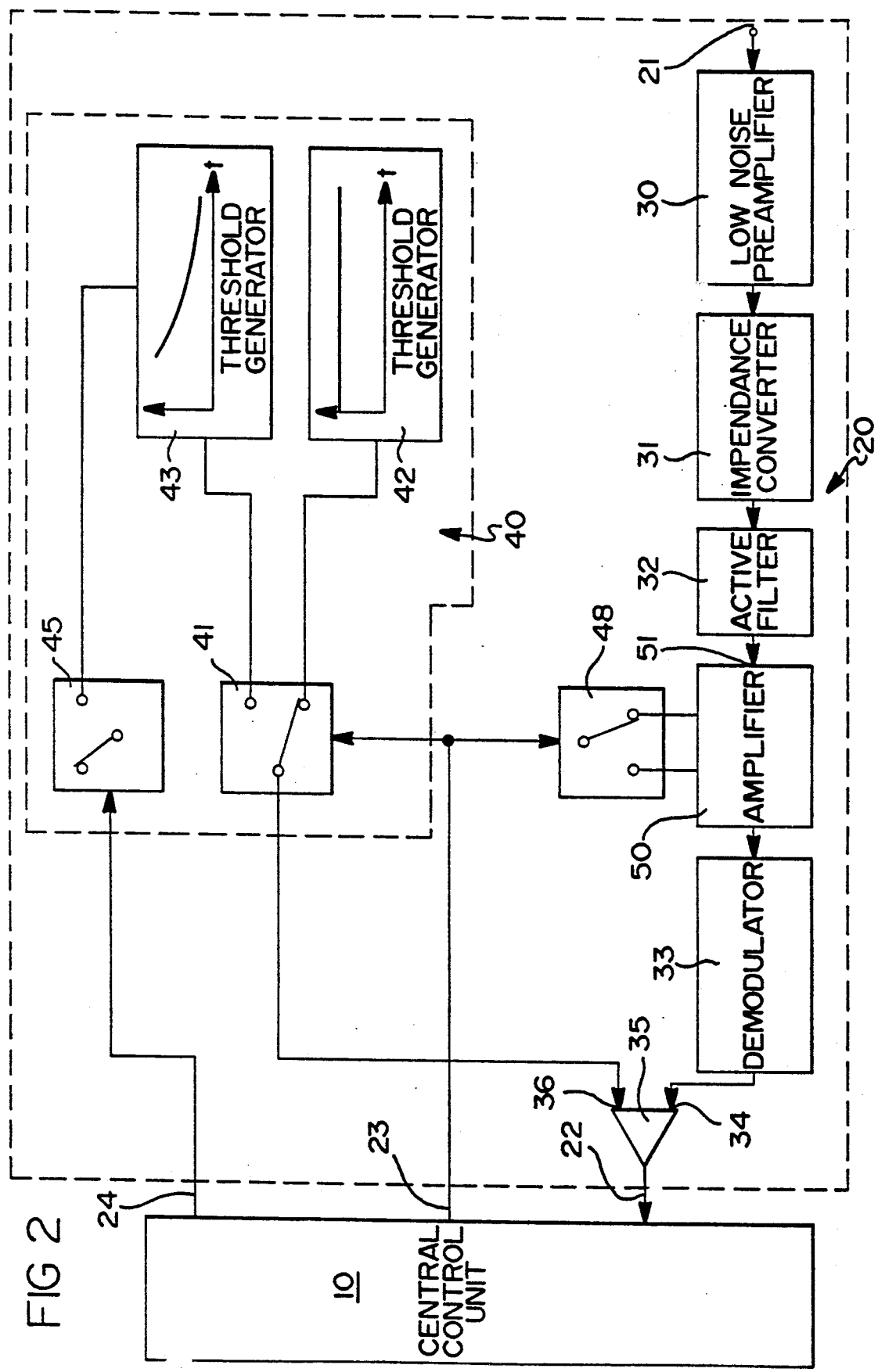

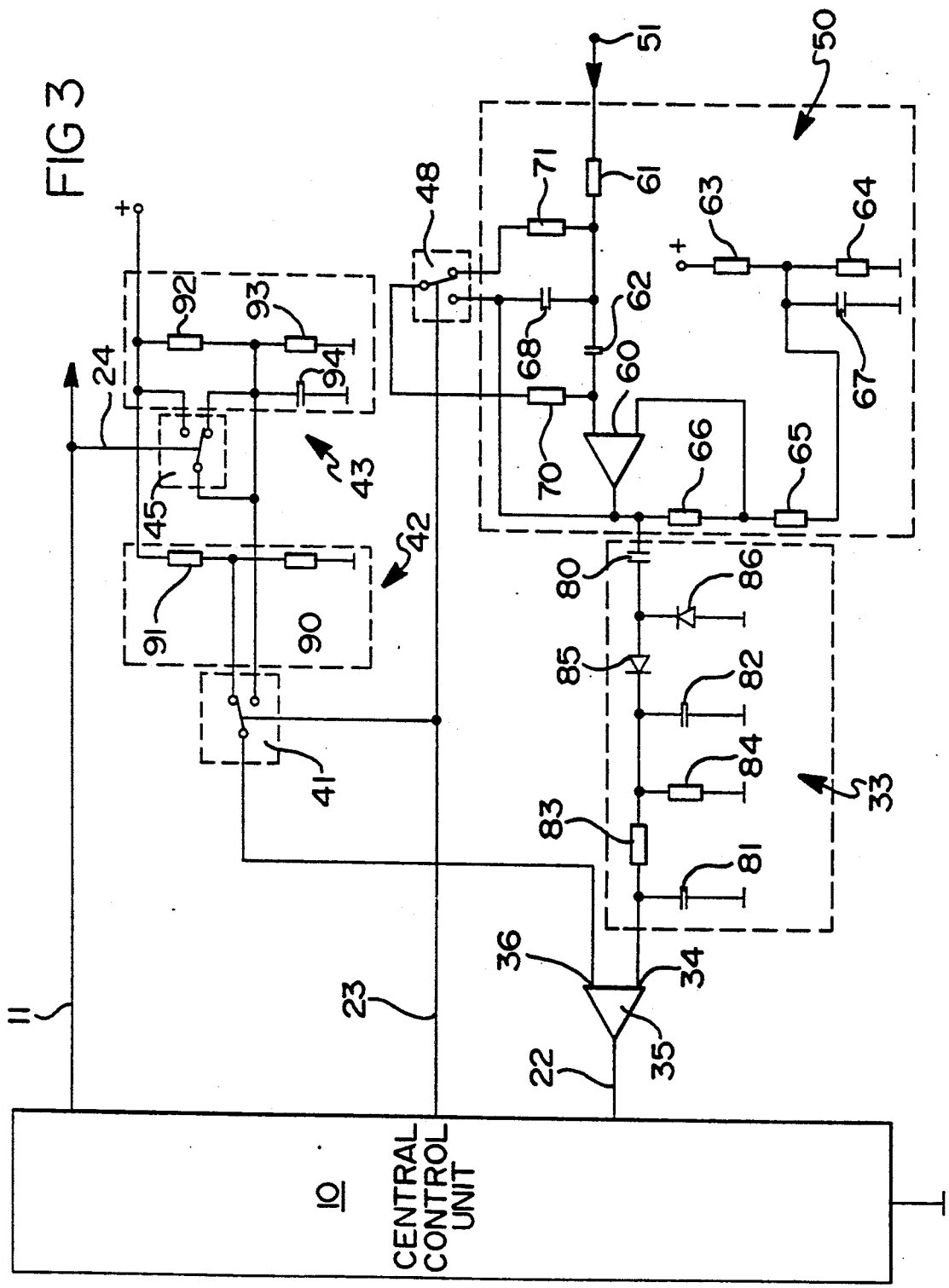

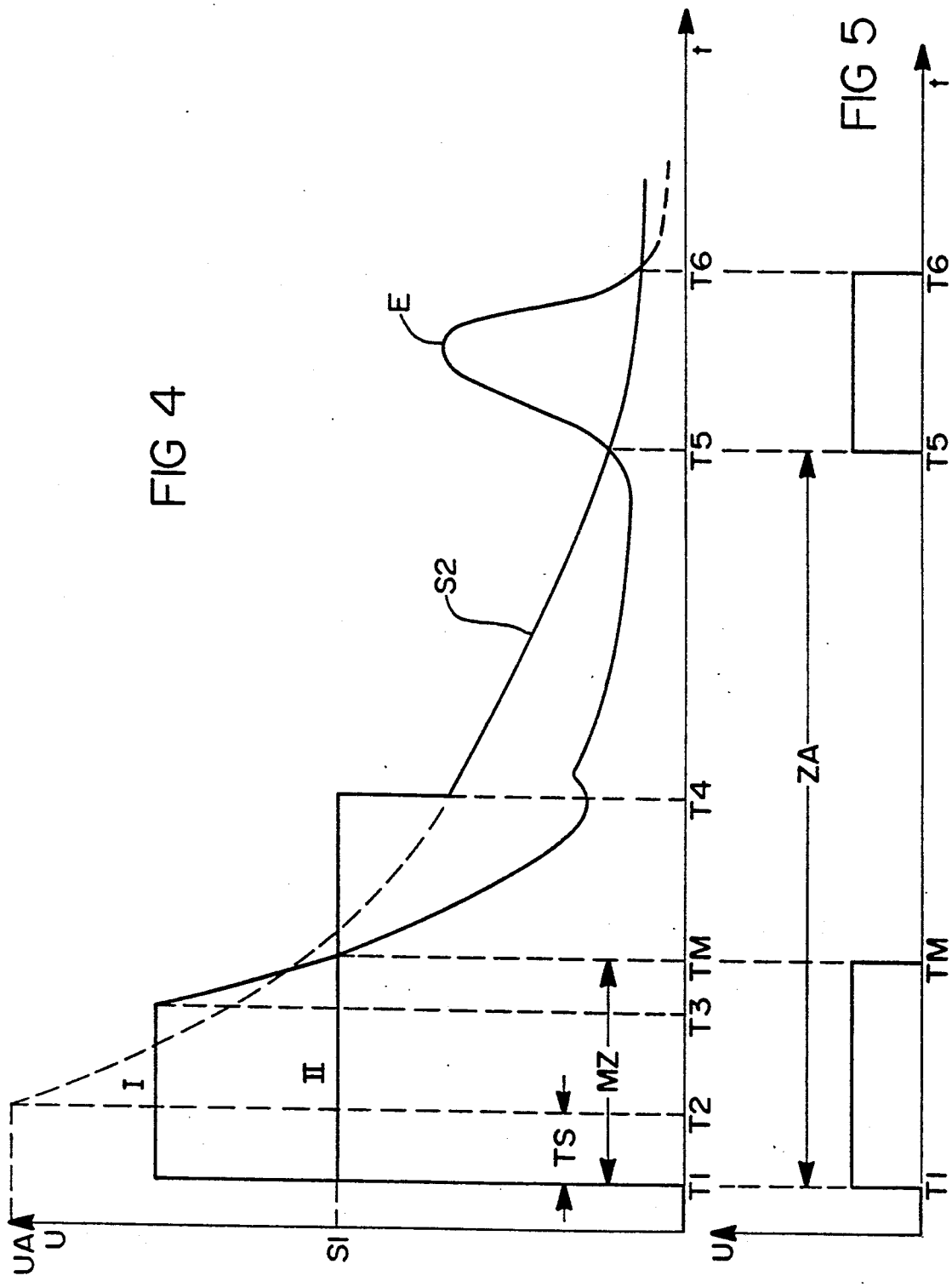

DISTANCE MEASURING DEVICE

INTRODUCTION

The present invention relates to a distance measuring device, especially for motor vehicles, comprising at least one electroacoustic converter for transmitting and receiving ultrasonic signals, a generator for activating the converter and a signal receiving stage for processing the echo signals detected by the converter, which signal receiving stage comprises an amplifier with a following comparator which compares the output signal of the amplifier with a particular threshold value adjusted to a first value when the activation of the comparator is started.

BACKGROUND OF THE INVENTION

Distance measuring devices have become known in which an ultrasonic signal is at first transmitted via an electroacoustic converter for a particular time. Thereafter, when the said ultrasonic signal has been reflected on an obstacle, it is received from the same converter as an echo signal. From the time difference between transmission of the ultrasonic signal and reception of the echo signal the distance of the obstacle from the converter can be computed. Devices of this kind are used in a motor vehicle, in order to facilitate maneuverizing in narrow parking space to minimize the risk of colliding with another vehicle. Such devices for measuring the distance between motor vehicles therefore ought to have a detection range from about 1.5 m to 0.25 m. Undesired false signals such as those caused by ground echos must be minimized. Furthermore in devices of this kind, target obstacles must be reliably detected over the entire above mentioned range of detection independently of their reflection properties.

An important problem in developing such distance measuring devices is that after activation of the converter a significant time passes in which the converter output decays. Although the amplitude of the signal measured at the converter decreases relatively rapidly, the measured signal considerably exceeds the component contributed by echo signals. Thus echo signals which may hit the converter during the decay time, cannot be recognized. Thus in a system of this kind the lower limit of the measuring range, in which the converter serves to transmit ultrasonic signals and simultaneously to receive echo signals, is dependent on the decay time of the converter. However the decay time is dependent on various factors. In addition to construction tolerances, influences of temperature play an important role.

Consequently known constructions in which, during a defined time from the beginning or from the end of the activation of the converter, the receiver is blocked, do not show fully satisfactory operational properties. If the time, in which the receiver is blocked, is indeed relatively long and thus an evaluation of the echo signals is prevented, the lower limit of the measuring range will not reach values in the order of magnitude of 0.25 m. If, however, this time is reduced, it can happen with unfavorable influences, that an echo signal is pretended and evaluated by the converter still decaying.

BRIEF DESCRIPTION OF THE INVENTION

The present invention is based on the problem of developing a distance measuring device according to the initially mentioned kind with simple means in such a way, that, in a predetermined range of detection, which approaches the converter as closely as possible, obstacles are detected and evaluated with satisfactory accuracy.

The foregoing problems of prior known devices is solved by the invention in that the threshold value for the comparator may be changed over from the first value to a second one by a switching stage, the first value thereby exceeding the highest value which may be measured on the basis of an echo signal and the second value lies within a range of values which may be measured on the basis of echo signals, wherein in a time detecting stage a measured time is detected from the beginning of the activation of the converter up to the changeover of the comparator, when, because of the dying-out of the converter the decaying measured signal falls below the first threshold value, and wherein in one computer stage a later changeover time is computed from the said measured time, at which changeover time the switching stage changes over the threshold value for the comparator to the second, lower value for evaluating the echo signals.

The present invention is thereby based on the idea of being capable to assess the tolerance-dependent and temperature-dependent dying-out process of a converter with sufficient accuracy, when during the dying-out time, thus in case of signal levels on the converter exceeding the range in which echo signals may be measured, the time is determined in which the signals fall below a particular threshold of a comparator. This measured time varies indeed from converter to converter, whereby influences of temperature have also been considered. From this period of time passing between the activation of the converter and falling below a first threshold of the comparator a later changeover time can be computed, in which the threshold value for the comparator is changed over to a second, lower value lying within the range of detection which is reached with such echo signal which normally come into existence in the desired range of detection.

Thus in the present invention a constant, firm decaying period is not assumed for all converters, but the further course of the dying-out process of the converter is rather assessed from the course of the dying-out process shortly after the activation of the converter has been terminated and, from the individually computed changeover time, a measuring process for the then decreased threshold of the comparator may be enabled. According to this method an echo is even reliably recognized, if the obstacle is so close to the converter that the echo signal is terminated only shortly after the changeover time of the threshold. In comparison with known constructions the lower limitation of the measuring range can therefore be moved in a direction towards lower values.

According to a preferred development of the invention the second threshold value is to be variable in dependence on time according to a predetermined function and the function is preferably dependent on the reciprocal of the time. In this manner it can be ensured that echo signals of obstacles being in a larger distance from the converter and having a relatively low degree of reflection or themselves being relatively small, can be accurately detected. The echo signals released by these obstacles hit the converter again at a relatively late time and at this time the threshold value of the comparator is appropriately reduced in a device developed in accordance with the above mentioned features. On the other hand it is ensured by this measure that no undesired echo signals are pretended in a very short range. This is in particular applicable for echos from the road surface which cannot be prevented, but the signal levels of which are at this time below the still relatively high threshold value on the comparator.

This time-dependent function, according to which the threshold value of the comparator decreases, is in a preferred embodiment derived from the capacitor voltage to be measured in a discharge. The capacitor is thereby charged during the activation of the converter. At the end of this activation the capacitor voltage has a defined initial value for the threshold value decreasing according to a time-dependent function. As far as circuit technique is concerned an embodiment of this kind has advantages, because the activation of the converter is utilized to charge the capacitor and the beginning of the discharge of the capacitor, i. e. the end of the activation, is fixed at a time which may be determined without any additional subcircuits.

The time-dependent threshold for the comparator could be determined in such a way that the echo signals are accurately detected in the desired range of detection. However this could entail the consequence that the threshold value falls off to values which, at any rate when the circuit arrangement or the wiring on a printed circuit board are not properly laid out, may scarcely be detected with satisfactory accuracy. This is why according to an especially preferred development of the invention the amplifying factor of the amplifier connected in series with the comparator is simultaneously changed over, when the threshold value is changed over to a higher value. Then the time-dependent characteristic of the second threshold value for the comparator can so-to-speak at a particular factor be shifted to higher signal levels. Nevertheless echo signals from relatively distant obstacles are also detected, because the signal levels of the latter are now satisfactorily raised by the amplifier now changed over to a higher amplifying factor.

The basic idea of the present invention has so far been described by way of a construction in which the threshold value of the comparator is changed over during the dying out process. However the same results are principally achieved, if only one threshold is used, but rather changes over the amplification of the amplifier connected in series to the comparator. In the transmission process and upon part of the dying-out process the amplifier is thus intended to be operated with lower amplification. If the value falls below the predetermined threshold, from the time passed from the beginning of the activation at which the amplifying factor of the amplifier will be changed over to a higher value a changeover time can be computed. The corresponding is applicable as far as the time-dependent threshold is concerned, that means also from the beginning of the changeover time the amplifying factor of the comparator can even be changed in dependence on time, when the threshold value is constant. A disadvantage of an embodiment of this kind is indeed that the development of an amplifier with the desired time-dependent course of the amplifying factor under the present conditions, thus comparatively low signal voltages, due to unavoidable tolerances and the thermal behavior of the components raises greater problems than a circuit arrangement with a comparator threshold which may be changed over and is partially time-dependent, in which the amplifying factor may only be changed over between two firm values.

The invention and its advantageous developments are described below in detail by way of an embodiment shown in the accompanying drawings.

BRIEF DESCRIPTION OF THE DRAWINGS

FIG. 1 is a block diagram of a distance measuring device.,

FIG. 2 is a block diagram with more details, in particular with regard to the signal receiving stage;

FIG. 3 is a concrete circuit diagram of part of the signal receiving stage;

FIG. 4 shows the timewise course of signals appearing at the comparator inputs of the signal receiving stage; and FIG. 5 shows the timewise course of the comparator output signal.

DETAILED DESCRIPTION OF THE PREFERRED EMBODIMENT OF THE INVENTION

According to FIG. 1 a central control unit 10 with a microcomputer and a program store programmed in a suitable way are part of a distance measuring device. At one output the central control unit 10 produces high-frequency oscillations, which are conducted to a transmitter stage 12 via a lead 11. In the transmitter stage 12 the signal is transformed to a suitable higher voltage level. The output of transmitter stage 12 is connected a transmitter multiplexer 13 which cyclically distributes the transmitter signal transformed to a higher voltage to one of n converters 15. In addition the transmitter multiplexer 13 is connected with one output of the central control device 10 via the selection lead 14.

The transmitter section of the distance measuring device operates as is known in itself in such a way that one each of the converters 15 is activated by a signal for a particular time, namely the transmitting time TS, which signal is released by the central control unit 10 and appropriately amplified through the transmitter stage 12. The central control device 10 together with the transmitter stage 12 thus serve the function of a generator for activating an electroacoustic converter 15, which then transmits ultrasonic signals.

The transmitter multiplexer 13 is of course only necessary, if in cyclic order several converters 15 are to be controlled one after the other as is customary in a distance measuring device in motor vehicles having several electroacoustic converters in the rear and front areas. In systems with only one electroacoustic converter the said transmitter multiplexer 13 is not necessary. The signal of the transmitter stage 12 is then directly conducted to the electroacoustic converter 15.

The receiver section comprises a receiver multiplexer 17 which in accordance with a signal on the selection lead 18 connects one converter 15 each with a signal receiving stage altogether designated 20. Details of the signal receiving stage are shown in FIGS. 2 and 3. From FIG. 1 it can be seen that the signal receiving stage 20 has an input 21 connected with the receiver multiplexer 17 and an output lead 22 conducted to central control unit 10. In addition two control leads 23, 24 are conducted to the signal receiving stage 20, the control lead 24 thereby being connected with the lead 11 conducted from the central control unit 10 to the transmitter stage 12.

The echo signals received by an electroacoustic converter 15 are amplified by the signal receiving stage 20 and conducted to a comparator, as will be illustrated later on. When such an echo signal is received, the comparator 35 (FIG. 2) in the signal receiving stage 20 changes its switching condition and the signal is then recognized by the central control unit 10. From the time difference between the beginning of the activation of a converter and the switching condition to be tapped off from the output of the signal receiving stage 20 and symbolizing an echo signal the central control unit 10 computes the distance between the converter and an obstacle releasing an echo signal. This distance is then optically or acoustically indicated in an indicator 19.

It is again emphasized that a receiver multiplexer 17 is only necessary, when the echo signals on several converters are to be sensed one after the other in cyclical order via a central control unit 10. Otherwise the echo signal received by the electroacoustic converter can directly be received by the signal receiving stage 20.

In FIG. 2 details of the signal receiving stage 20 are now shown in more detail. The signal appearing at the input 21 of the signal receiving stage 20 is at first amplified in a low-noise preamplifier 30. The amplified signal is then conducted to an impedance converter 31 to the output of which a first active filter 32 is connected. The output of the first active filter 32 is connected with the input 51 of an amplifier altogether designated 50, which will later on be illustrated more exactly by way of FIG. 3. The signal amplified by the amplifier 50 is then conducted via a demodulator 33 to an input 34 of comparator 35, the other input of which is designated 36.

In FIG. 2 a switching stage is designated 40, which comprises an analog switch 41 and a first threshold generator 42 and a second threshold generator 43. The signal of one threshold generator 42 or the signal of the other threshold generator 43 can be connected to one input 36 of the comparator 35 in dependence on the signal on the control lead 23 via the analog switch 41. It has been indicated in FIG. 2 that the threshold generator 42 supplies a time-constant threshold value, whereas the other threshold generator 43 supplies a second, time-dependent threshold value. Furthermore another analog switch 45 is schematically shown in FIG. 2, which analog switch is controlled via the control lead 24. As will be illustrated later on an initial value for the time-dependent threshold value of the threshold generator 43 is set via the said analogue switch 45. Thereby the time-dependent course of the threshold value of the threshold generator 43 is derived from the discharge of a capacitor. At last a further analog switch 48 is provided which, just as the analogue switch 41, is controlled for changing over the threshold values for the comparator 35. As will also be illustrated later on the amplifying factor of the amplifier 50 is controlled via the analog switch 48.

An important component of the amplifier 50 shown in FIG. 3 is an operational amplifier 60, to which the preamplified and filtered signal is conducted via the input 51, the resistor 61 and the capacitor 62. The operational amplifier 60 is selectively wired in a manner known in itself. Part of the wiring including operating point adjustment of the operational amplifier 60 are the resistors 63, 64, 65, 66 and the capacitor 67. In the feedback circuit determining the amplifying factor is inserted in dependence on the switching condition of the analog switch 48 either the relatively big reaction resistor 70 or, in the switching position shown, the relatively small reaction resistor 71. In the reaction circuit there is also inserted a capacitor 68 which in the switching condition not shown affects the frequency behavior in cooperation with the capacitor 62.

From this description may altogether be derived that in dependence on the switching position of the analog switch 48 the amplifying factor of the amplifier 50 may be changed over from a first low value to a second higher value. The importance of this amplifying factor to be changed over will be illustrated later on.

The output signal of the operational amplifier 60 is conducted to demodulator 33, in which the capacitors 80, 81, 82, the resistors 83, 84 and, as important components, the two diodes 85, 86 are included. An envelope curve to the high-frequency alternating voltage at the output of the amplifier is formed by the demodulator 33. The output signal of the demodulator 33 is conducted to input 34 of the comparator 35.

From FIG. 3 the concrete construction of the two threshold generators 42 and 43 can also be recognized. The threshold generator 42 producing the constant threshold value includes the two resistors 90, 91 forming a voltage divider between the positive voltage and ground, while one input of the analog switch 41 is connected to the common junction point of the two resistors 90, 91.

The other threshold generator 43 comprises the two resistors 92 and 93 and the capacitor 94. When the analog switch 45 occupies its operating position the capacitor 94 is charged to a positive voltage value. When, however, the analog switch occupies the rest position shown, the charging of the capacitor 94 is interrupted and the discharging begins. If the analogue switch 41 is now changed over into the operating position the capacitor voltage is applied on the second input 36 of the comparator. Consequently a temporarily variable threshold value may be measured on the input 36.

The mode of operation of the said distance measuring device will now be described in detail by way of FIGS. 4 and 5.

FIG. 4 shows a first curvature I showing the timewise course of the voltage to be measured at the input 34 of the comparator. Because the comparator input 34 is permanently and invariably connected with the electroacoustic converter 15 via the various amplifier stages, the curvature I also illustrates the course of the signal voltage to be measured at the electroacoustic converter 15. Of course the high-frequency oscillations cannot be seen, because the signal is demodulated. Thus only the envelope of these oscillations is shown. At the time T1 the converter 15 begins to become excited. At the time T2 the activation of the converter 15 is terminated. This means in practice that in the time interval between T1 and T2 a pulse package with a relatively high amplitude is conducted to the electroacoustic converter via the transmitter stage 12, so that an ultrasonic signal of a particular power is radiated. Thus the electric excitation is terminated at the time T2. At the time T2 the dying-out process of the converter begins, whereby because of the heavy overloading of the signal receiving stage the same voltage level may at first be measured at the input 34 of the comparator. From the time T3 the dying-out of the converter may now also be recognized at the input of the comparator 34 because of the now decreasing signal amplitude. At the time T4 the signal has decayed so far, that with the usual level of the echo signals a measuring process is now possible. Thus by the time T4 the end of the realistic oscillation time of the converter is marked for the present application. At the time T5 the signal voltage at the input 34 of the comparator 35 rises again significantly. The reason is a reception of an echo signal which appears in the period of time between T5 and T6.

The curvature II in FIG. 4 shows the time-dependent voltage course at the other input 36 of the comparator 35. FIG. 5 shows the signal at the output of the comparator 35. From FIG. 4 can at first be seen that with the beginning of the activation of the converter a first threshold value S1 may be measured at the comparator input 36. The said first threshold value S1 is retained up to the time T4. Then the analogue switch 41 is changed over and consequently a time-dependent threshold value S2 is conducted to the input 36 of the comparator, which threshold value decreases with the time t.

Here the first threshold value S1 considerably exceeds the highest signal levels to be measured because of an echo signal E. Consequently a time TM is reached independently of the appearance of an echo signal E, at which time the envelope curve of the signal voltage at the input 34 of the comparator 35 corresponding to the reception signal on the converter 15 falls below the first threshold value S1. The time interval between T1 and TM is thereby dependent on environmental influences, in particular also on the temperature in the vicinity of the converter. From this measured time MZ between T1 and TM the further course of the dying-out process of the converter 15 can be accurately assessed. The central control unit 10 computes a changeover time T4 from this measured time MZ, at which changeover time the switching stage 40 changes over the threshold value conducted to the comparator input 36 to the variable second threshold value S2. Thus the analog switch 41 is changed over into its operating position at this changeover time T4 and thus the discharging voltage of the capacitor 94 is switched onto the input 36 of the comparator 35. The level of the voltage to be measured at this time is not constant. From FIG. 3 can be derived that during the activation of a converter, thus in the time interval between T1 and T2, the analog switch 45 is periodically changed over into its operating position and therefore, during the activation of a converter, the capacitor 94 is rapidly charged to a defined initial value UA. This can be derived from the fact that the control lead 24 leading to the analog switch 45 is connected with the lead 11, which connects the transmitter stage 12 with the central control unit 10 and thus carries a pulse signal during the activation of the converter. Thus at the time T2 the capacitor 94 is charged to a defined initial value UA and, in dependence on the measured time MZ and the changeover time T4 computed therefrom, at the beginning of the changeover of the threshold value conducted to the comparator 35 the capacitor voltage can at first be higher or lower than the first threshold value S1. At any rate the threshold value S2 will decrease rapidly in such a way that at a predetermined amplifying factor echo signals may now be evaluated.

At the time T5 the signal coming from the converter exceeds the threshold value S2 according to curvature I and the comparator 35 thus changes its switching condition in the time interval between T5 and T6, thus during the appearance of the echo signal. The interval ZA between the two positive flanks at the output of the comparator 35 is a measurement for the distance between an obstacle releasing an echo signal and the converter. The central control unit 10 can compute the concrete distance in cm from this interval ZA and conduct a corresponding signal to the indicator 19.

Thus the following has altogether to be stated with regard to the distance measuring device according to the invention:

The threshold value for the comparator 35, thus the signal voltage conducted to one input 36, may be changed over through a switching stage 40 with an analog switch 41 from a first value predetermined be the threshold generator 42 to a second one predetermined by the threshold generator 43. Thereby the first threshold value S1 is constant and exceeds the highest value which may be measured because of an echo signal. In contrast thereto the second threshold value S2 lies in a range of values which may be expected because of usual echo signals.

The central control unit 10 includes a time detecting stage detecting a measured time MZ from the beginning of the activation of the converter at the time T1 up to the changeover of the output signal of the comparator 35 at the time TM. At this time TM the decaying signal falls below the first threshold value S1 due to the dying-out of the converter. This time-detecting stage is in practice realized by a suitable program, the facts of which can in a simplified manner be conceived in such a way that upon beginning of the activation of a converter the indication of a counter clocked by an oscillator is read and that the indication of this counter is read off anew, when the comparator again changes its switching condition.

Finally the central control unit 10 comprises a computer stage also realized by a suitable program, from which computer stage a later changeover time T4 is computed from this measured time MZ, at which changeover time the time-dependent second threshold value S2 is adjusted via the switching stage 40 by changing over the analog switch 41. The threshold value S2 decreasing according to a time-dependent function is derived from the voltage to be measured when the capacitor 94 is discharged, which is charged during the activation of the converter, thus in the time interval from T1 to T2, so that, at the end of the activation at the time T2, it has a defined output voltage UA as an initial value for the time-dependent function. The course of the said time-dependent threshold value S2 is dependent on the reciprocal of time, thus the threshold value decreased with increasing time difference at the beginning of the activation of a converter. The facts can also be expressed in such a way that the threshold value for echo signals released at obstacles in a small distance is higher than the threshold value for echo signals released at obstacles in a greater distance. By changing the system sensitivity during the measuring cycle it is to be ensured that also relatively small obstacles can still be accurately detected in a greater distance, but on the other hand undesired echos from a short distance, for example coming from the road, do not release a measured value at the indicator.

In FIG. 4 a short rise of the curvature I can be seen in the vicinity of the changeover time T4. This linked with the fact that the amplifying factor of the amplifier 50 connected in series with the comparator 35 may be changed over. The control signal on the lead 23, which also changes over the threshold values from S1 to S2 via the analog switch 41, also affects the analog switch 48 in the reaction circuit of the operational amplifier 60. The conditions are selected in such a way that at the beginning T1 of the converter activation the amplifying factor is adjusted to a low value and at the same time with the changeover of the threshold values it is changed over to a higher value at the time T4. In a concrete embodiment the amplification is changed by a factor 10. This is to that extent not to be seen by way of the curvature I in FIG. 4, because the demodulator 33 is not in a position directly to transmit abrupt changes. Furthermore it has to be considered that, when the amplifying factor is changed over, the signal voltage of the dying-out converter continues to decrease considerably, so that the increase of the amplifying factor is nearly completely compensated. It is therefore emphasized that the curvature I shows the facts in an exaggerated way in the area T4.

Altogether it has to be stated that by changing over the threshold value on the comparator according to the invention the lower limitation of the measuring range of the distance measuring device can be shifted to smaller values. Thereby an echo signal is even reliably recognized, when the obstacle is so close to the converter that the end of the envelope of the echo signal lies shortly behind the changeover time T4 of the threshold values. In a case like this it is indeed not the beginning of an echo signal, thus the time T5, which is detected. However it is at least indicated that an obstacle is positioned in front of the converter with a small distance. The exact distance if such extremely short distances is however of secondary importance to the motor vehicle driver, because then a maneuvering in front of an obstacle is as a matter of fact practically not possible because of the then very small distances.

What is claimed is:

1. A distance measuring device comprising:
transmitter means operative to radiate relatively high frequency incident signals within a designated area; and
receiver means operative to detect such signals reflected from a target object within said area, said receiver means including amplifier means operative to receive said reflected signals and generate an echo signal as a function thereof, and logic means operative to generate a user sensible signal as a function of the difference between a first substantially fixed value threshold signal and said echo signal for a period of time varying as a function of an interval between transmission of said incident signals an said threshold-echo signal difference substantially equaling a predetermined value, and thereafter as a function of the difference between a second variable, generally decaying threshold signal and said echo signal.

2. The device according to claim 1, wherein said amplifier means has a characteristic gain which varies as an alternate function of said first and second threshold signals.

3. A distance measuring device comprising at least one electroacoustic converter for transmitting and receiving ultrasonic signals, a generator for activating the converter and a signal receiving stage for the echo signals detected by the converter, said signal receiving stage including an amplifier and a following comparator operative to compare an output signal of the amplifier with a particular threshold value which is adjusted to a first value upon activation of the comparator, wherein the threshold value for the comparator may be changed from the first value to a second valve by a switching stage, the first value exceeding the highest value of said echo signal and the second value falling within a range of values substantially coinciding with a range of values of said echo signal, wherein a time detecting stage a measured time is detected from the beginning of the activation of the converter up to a changeover of the comparator, when, because of a dying-out characteristic of the converter the decaying echo signal falls below the first threshold value, and wherein in a computer stage a later changeover time is computed from the said measured time, at which changeover time the switching stage changes over the threshold value for the comparator to the second, lower value, wherein the second threshold value decreases according a predetermined function proportional to the reciprocal of time.

4. A distance measuring device comprising at least one electroacoustic converter for transmitting and receiving ultrasonic signals, a generator for activating the converter and a signal receiving stage for the echo signals detected by the converter, said signal receiving stage including an amplifier and a following comparator operative to compare an output signal of the amplifier with a particular threshold value which is adjusted to a first value upon activation of the comparator, wherein the threshold value for the comparator may be changed from the first value to a second valve by switching stage, the value exceeding the highest value of said echo signal and the second value falling within a range of values substantially coinciding with a range of values of said echo signal, wherein in a time detecting state a measured time is detected from the beginning of the activation of the converter up to a changeover of the comparator, when, because of a dying-out characteristic of the converter the decaying echo signal falls below the first threshold value, and wherein in a computer stage a later changeover time is computed from the said measured time, at which changeover time the switching stage changes over the threshold value for the comparator to the second, lower value, wherein the second threshold value decreases according a predetermined function in dependence on time, and wherein a defined initial value for the threshold value decreasing in accordance with a time-dependent function is set with the end of the activation time of the converter.

5. A distance measuring device comprising at least one electroacoustic converter for transmitting and receiving ultrasonic signals, a generator for activating the converter and a signal receiving stage for the echo signals detected by the converter, said signal receiving stage including an amplifier and a following comparator operative to compare an output signal of the amplifier with a particular threshold value which is adjusted to a first value upon activation of the comparator, wherein the threshold value for the comparator may be changed from the first value to a second valve by a switching stage, the first value exceeding the highest value of said echo signal and the second value falling within a range of values substantially coinciding with a range of values of said echo signal, wherein in a time detecting stage a measured time is detected from the beginning of the activation of the converter up to a changeover of the comparator, when, because of a dying-out characteristic of the converter the decaying echo signal falls below the first threshold value, and wherein a computer stage a later changeover time is computed from the said measured time, at which changeover time the switching stage changes over the threshold value for the comparator to the second, lower value, wherein the second threshold value decreases according a predetermined function in dependence on time, and wherein during the activation time of the converter a capacitor is charged and that the second threshold value is derived from the capacitor voltage when the latter is discharged.

6. A distance measuring device comprising at lest one electroacoustic converter for transmitting and receiving ultrasonic signals, a generator for activating the converter and a signal receiving stage for the echo signals detected by the converter, said signal receiving stage including an amplifier and a following comparator operative to compare an output signal of the amplifier with a particular threshold value which is adjusted to a first value upon activation of the comparator, wherein the threshold value for the comparator may be changed from the first value to a second valve by a switching stage, the first value exceeding the highest value of said echo signal and the second value falling within a range of values substantially coinciding with a range of values of said echo signal, wherein a time detecting stage a measured time is detected from the beginning of the activation of the converter up to a changeover of the comparator, when, because of a dying-out characteristic of the converter the decaying echo signal falls below the first threshold value, and wherein in a computer stage a later changeover time is computed from the said measured time, at which changeover time the switching stage changes over the threshold value for the comparator to the second, lower value, wherein the amplifying factor of the amplifier connected in series with the comparator may be changed over and, when the activation of the converter is started, is adjusted to a lower value and is changed over to a higher value simultaneously with the threshold value for the comparator.

* * * * *